United States Patent [19]

Stone

[11] Patent Number: 4,989,131
[45] Date of Patent: Jan. 29, 1991

[54] TECHNIQUE FOR PARALLEL SYNCHRONIZATION

[75] Inventor: Harold S. Stone, Chappaqua, N.Y.

[73] Assignee: International Business Machines Corporation, Armonk, N.Y.

[21] Appl. No.: 224,846

[22] Filed: Jul. 26, 1988

[51] Int. Cl.$^5$ .............................................. G06F 13/00
[52] U.S. Cl. ................................... 364/200; 364/229; 364/229.2; 364/230; 364/230.5; 364/271; 364/271.2
[58] Field of Search ... 364/200 MS File, 900 MS File

[56] References Cited

U.S. PATENT DOCUMENTS

| | | | |
|---|---|---|---|
| 4,051,551 | 9/1977 | Lawrie et al. | 364/200 |
| 4,101,960 | 7/1978 | Stokes et al. | 364/200 |
| 4,247,892 | 1/1981 | Lawrence | 364/200 |
| 4,257,096 | 3/1981 | McCullough | 364/200 |
| 4,306,286 | 12/1981 | Cocke et al. | 364/200 |
| 4,358,823 | 11/1982 | McDonald | 371/68.3 |
| 4,365,292 | 12/1982 | Barnes et al. | 364/200 |
| 4,395,758 | 7/1983 | Hebrius | 364/200 |
| 4,412,303 | 10/1983 | Barnes et al. | 364/900 |
| 4,523,273 | 6/1985 | Adams et al. | 364/200 |
| 4,590,555 | 5/1986 | Bourrez | 364/200 |
| 4,598,400 | 7/1986 | Hillis | 370/60 |
| 4,636,942 | 1/1987 | Chen et al. | 364/200 |
| 4,639,856 | 1/1987 | Hrustich | 364/200 |
| 4,661,900 | 4/1987 | Chen et al. | 364/200 |

FOREIGN PATENT DOCUMENTS 2178572A 2/1987 United Kingdom.

OTHER PUBLICATIONS

Gottlieb et al., "The NYU Ultra-Computer-Designing a MIMD, Shared Memory Parallel Machine", IEEE Trans. Comp., pp. 175-189, Feb. 1983.

Yew et al., "Distributing Hot-Spot Addressing in Large-Scale Multiprocessors", IEEE Trans. on Computers, vol. C-36, pp. 388-395, 1987.

DeMilt, "Inter-Quad Synchronization System for Modular Processing Systems", IBM Technical Disclosure Bulletin-vol. 16, No. 2, Jul. 1973, pp. 671-672.

*Primary Examiner*—David Y. Eng
*Attorney, Agent, or Firm*—Perman & Green

[57] ABSTRACT

A parallel synchronization technique utilizing a combining network in which two processors synchronize by having one processor suspend operation while the other processor becomes the agent for the one processor, while continuing to operate on its own behalf. This reduces the access requests and subsequent contention caused by multiple concurrent requests to a common variable.

16 Claims, 16 Drawing Sheets

FIG. 8

| FLAG | CURRENT INCREMENT |
|---|---|
| (empty) ||

FIG. 9

CURRENT SYNCH OPERAND →

| FLAG | CURRENT INCREMENT |
|---|---|
| OPD ADDRESS 1 ||
| OPD ADDRESS 2 ||
| (empty) ||

FIG. 10

CURRENT SYNCH OPERAND →

| FLAG | VALUE TO REPORT |
|---|---|
| OPD ADDRESS 1 ||
| OPD ADDRESS 2 ||
| OPD ADDRESS 3 ||
| OPD ADDRESS 4 ||
| OPD ADDRESS 5 ||

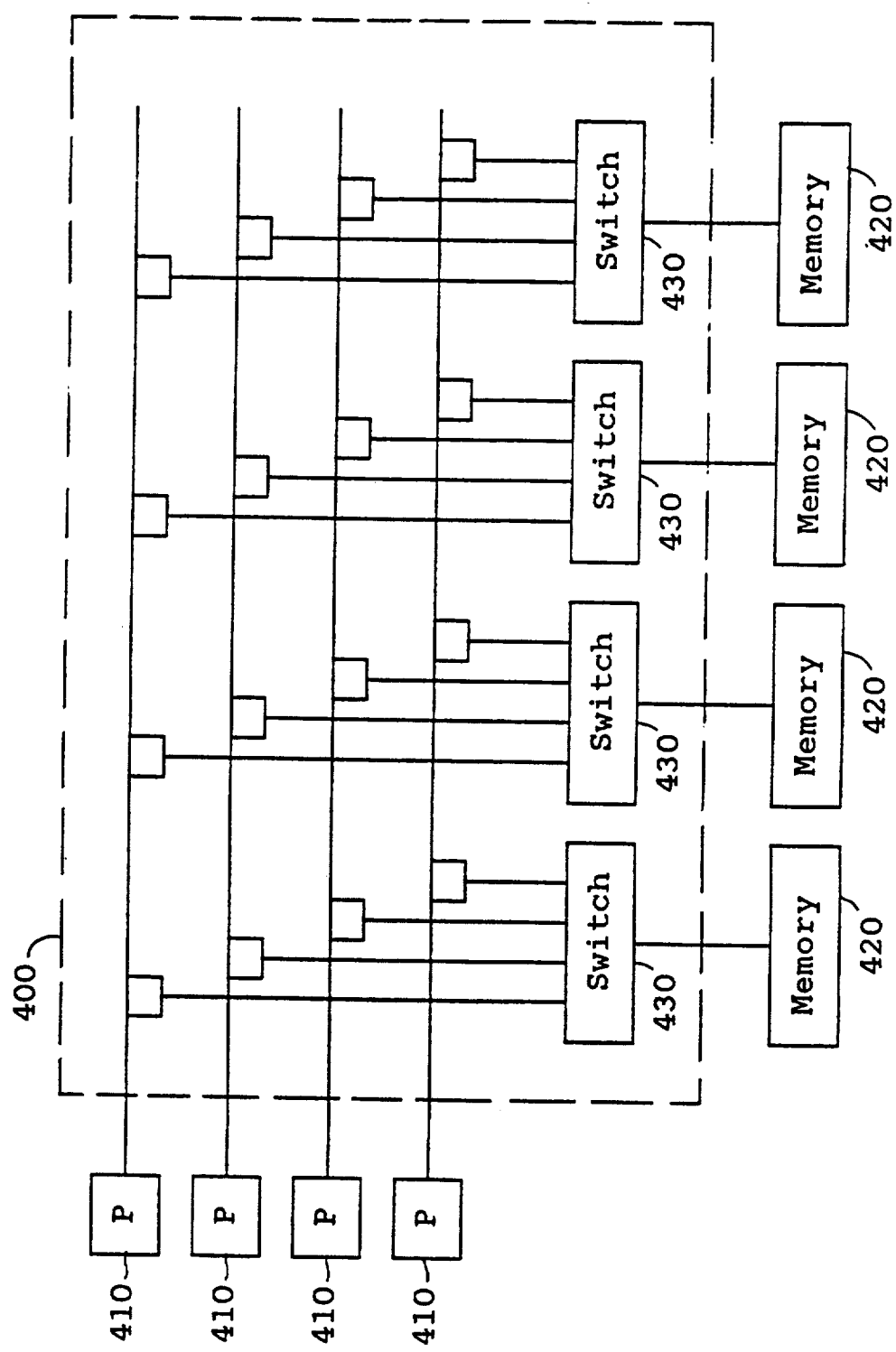

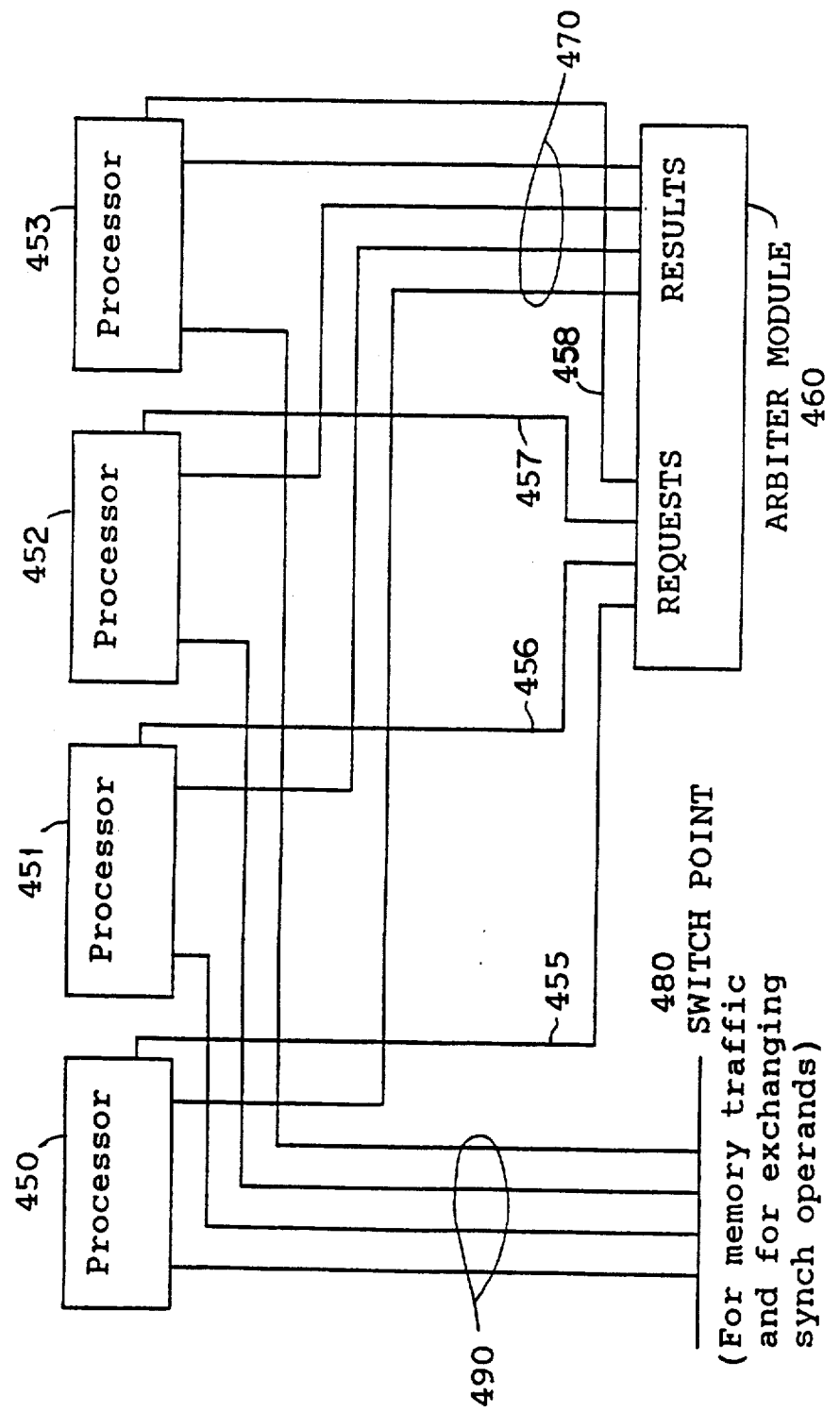

TECHNIQUE FOR PARALLEL SYNCHRONIZATION

DESCRIPTION

1. Technical Field

The invention is in the field of data processing, and in particular is directed to synchronizing parallel processes.

2. Background Art

Gottlieb, et al., in an article entitled "The NYU Ultracomputer-Designing a MIMD, Shared Memory Parallel Machine", IEEE Trans Comp. pp. 175-89, Feb. 1983, presented a technique for parallel synchronization based on the use of an instruction called "Fetch-and-Add" coupled with a network of switches of a type known as a "combining switch." The scheme described, is the first such scheme that permits N processors to synchronize their activities in a time that grows less than linearly in the number of processors. In practice, the synchronization time is a fixed constant that depends on the number of levels in the synchronization network. The number of levels grows as the log of the number of processors connected together.

Another approach taken by Yew, et al., in an article entitled "Distributing Hot-spot Addressing in Large-scale Multiprocessors", IEEE Trans. on Computers, Vol. C-36, pp. 388-395, 1987, simulates the combining operation in software, in effect distributing points of contention across many different memories Yew et al., reports that this is effective in improving performance without suffering the hardware penalty required to support combining. Their technique, however, is useful only for a restricted set of applications for which combining is applicable.

U.S. Pat. No. 4,636,942 to Chen et al., provides for two processors to share a set of common registers. It does not provide explicitly for combining. Moreover, combining is not particularly attractive for a 2-processor system, and is actually of greatest utility for systems with a large number of processors, say 128 or more. Chen et al. describe an idea that does not scale to more than a few processors, and is not feasible or attractive to use as described in systems with 128 or more processors.

U.S. Pat. No. 4,598,400 to Hillis discusses how to route messages in a connection network that contains a very large number of processors. Hillis is dedicated solely to routing, and not at all to synchronization of processor activity. There is no provision for detecting that two requests can be combined into a single request. Therefore, Hillis addresses a different problem and is not suitable for the synchronization/combining problem.

U.S. Pat. No. 4,523,273 to Adams et al. uses a multilayered switch network and enhances the basic network by adding an extra stage The purpose of the extra stage is to provide redundant paths so that in the event of a failure within the network, a message can be routed on an alternate path to the destination. Adams et al. is devoted to the discussion of routing in the presence of faults in the network, and is not directed to combining.

U.S. Pat. No. 4,412,303 to Barnes et al. is directed to a multilevel network and a synchronization facility, and is suitable for one type of synchronization, often called a "barrier" synchronization. While this is an important function, it is not a general method of synchronization. In Barnes et al., a processor must halt at a synchronization point, and no useful work is conducted by that processor or for that processor by any other processor until the synchronization is completed. The synchronizer of Barnes et al. does not reduce memory requests by combining requests nor can it permit a multiplicity of requesters to synchronize requests simultaneously at a queue, say by making concurrent updates of a queue pointer.

U.S. Pat. No. 4,365,292 to Barnes et al. is directed to an implementation of an Omega network and does not perform combining and does not synchronize processors.

U.S. Pat. No. 4,590,555 to Bourrez is directed to a means for synchronizing processes, but that is a minor capability of the patent. Its major thrust is to allocate processes among processors. When a process requires service, a signal of this requirement is recorded, and the process is halted until a processor is assigned When a running process reaches a point at which it can halt temporarily, it relinquishes a processor and the processor is reassigned to a process that is ready and awaiting assignment. Bourrez is directed to a hardware means to facilitate the allocation. The reassignment occurs when a process cannot continue because of a synchronization requirement. Hence, the hardware also provides a mechanism for synchronizing processes through a means by which one process can be suspended while synchronizing its activity with another process. There is no provision for combining of actions, and provides no means for one processor to communicate with another at the point of a synchronization. This is essential if one processor is to act as an agent for another.

U.S. Pat. No. 4,306,286 to Cocke et al. deals exclusively with connection of a multiplicity of processors, but does not treat the problem of combining operations to reduce contention. The patent is directed towards logic simulation, and its switching network provides only the ability to connect processors together. The switching network does not provide a means for one processor to act as the agent for another.

U.S. Pat. No. 4,101,960 to Stokes et al. describes a scientific multiprocessor that has innovative alignment network within a switch. The alignment network provides contention-free access to various portions of a matrix, so that rows, columns, diagonals, and some submatrices can be accessed as individual entities in one machine cycle per entity. Stokes et al is directed towards reducing access contention. Contention is reduced by the arrangement of data in memory and by the access switches to the data, as opposed to reducing access contention by assigning the work of one processor to another processor so that one processor can be idle while another processor acts as its agent. No such capability exists within Stokes et al.

U.S. Pat. No. 4,051,551 to Kuck et al describes a switch that accesses and aligns data that form multidimensional structures. The switch provides no means for combining requests.

U.S. Pat. No. 4,661,900 to Chen et al provides for access to shared memory from separate processors, and provides for the processors to synchronize their activities through shared registers. Chen et al. does not incorporate the idea of combining accesses so that one processor can act as an agent for another.

U.S. Pat. No. 4,247,892 to Lawrence provides for the interconnection of machines with queues at interfaces. It does not address the problem of contention for shared memory because the array structure does have a shared memory. Therefore, it does not address the issue of hot-spot contention, and the use of combining to reduce the hot-spots at shared memory by combining two or more requests into a single request.

UK Patent GB No. 2,178,572A to Jesshope provides a scheme for dynamically reconfiguring 1-bit processing elements into chains of varying lengths such that the reconfiguration produces groups of more powerful processors. A means of synchronization is included, which is required at the moments that the processor is reconfigured. The array of processors does not have a shared memory, and therefore does not exhibit a contention problem at the shared memory. There is no provision for one processor to act as an agent for another.

De Milt, "Inter-quad Synchronization System For Modular Processing Systems", IBM Technical Disclosure Bulletin Vol. 16, No. 2, July 1973 provides a way for synchronizing a plurality of processors. When several processors each have to access a shared resource, a means is included for selecting one of the requesters and denying the others.

According to the present invention, an alternative means is described for synchronization that combines both hardware and software in order to reduce the cost of implementation without seriously compromising performance. Arithmetic units at switch nodes are replaced by simple comparators and storage requirements imposed by combining are removed, thereby greatly reducing the cost of switch nodes, and possibly reducing the delay per node as well.

DISCLOSURE OF THE INVENTION

A parallel synchronization technique utilizing a combining network in which two processes synchronize by having one process suspend operation while the second process becomes the agent for the first process while continuing to operate on its own behalf. The effect of such combining is to reduce the access requests and subsequent contention caused by multiple concurrent requests to a common variable.

BRIEF DESCRIPTION OF THE DRAWINGS

FIG. 8 is a diagram of the initial data structure used for combining;

FIG. 9 is a diagram of the data structure after a "synch continue" is processed;

FIG. 10 is a diagram of the data structure at the point an agent is prepared to return values to its clients;

FIG. 13 is a block diagram of a crossbar switching network;

FIG. 14 is a block diagram of a switch point in a crossbar switch;

BEST MODE OF CARRYING OUT THE INVENTION

The invention provides an alternate technique for synchronizing parallel processes. It is less hardware intensive than techniques based on combining switches, yet the performance attainable may be close to equal the performance attainable from combining switches.

The invention is described in four parts as follows:
1. the general hardware structure for synchronization,
2. the supporting software implementation to use the hardware,
3. the hardware structure used in crossbar switches, and
4. the hardware structure used in multilevel switches.

1. General Hardware Description

Figure 1:
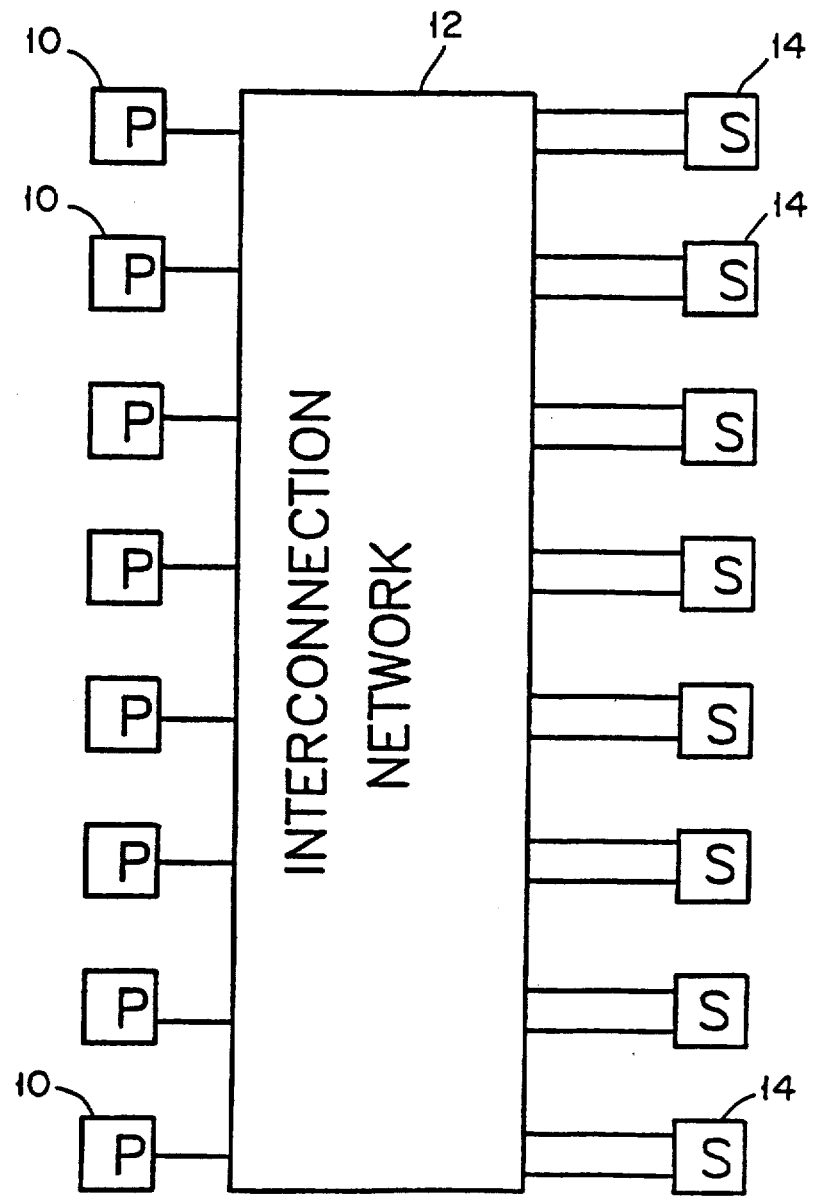
FIG. 1 is a block diagram of a basic synchronization network.

The general hardware of the invention is depicted in FIG. 1. The figure shows N processors 10, an interconnection network 12 and synchronizers 14. Each synchronizer 14, has two inputs, and thus arbitrates between two requests.

Figure 2:
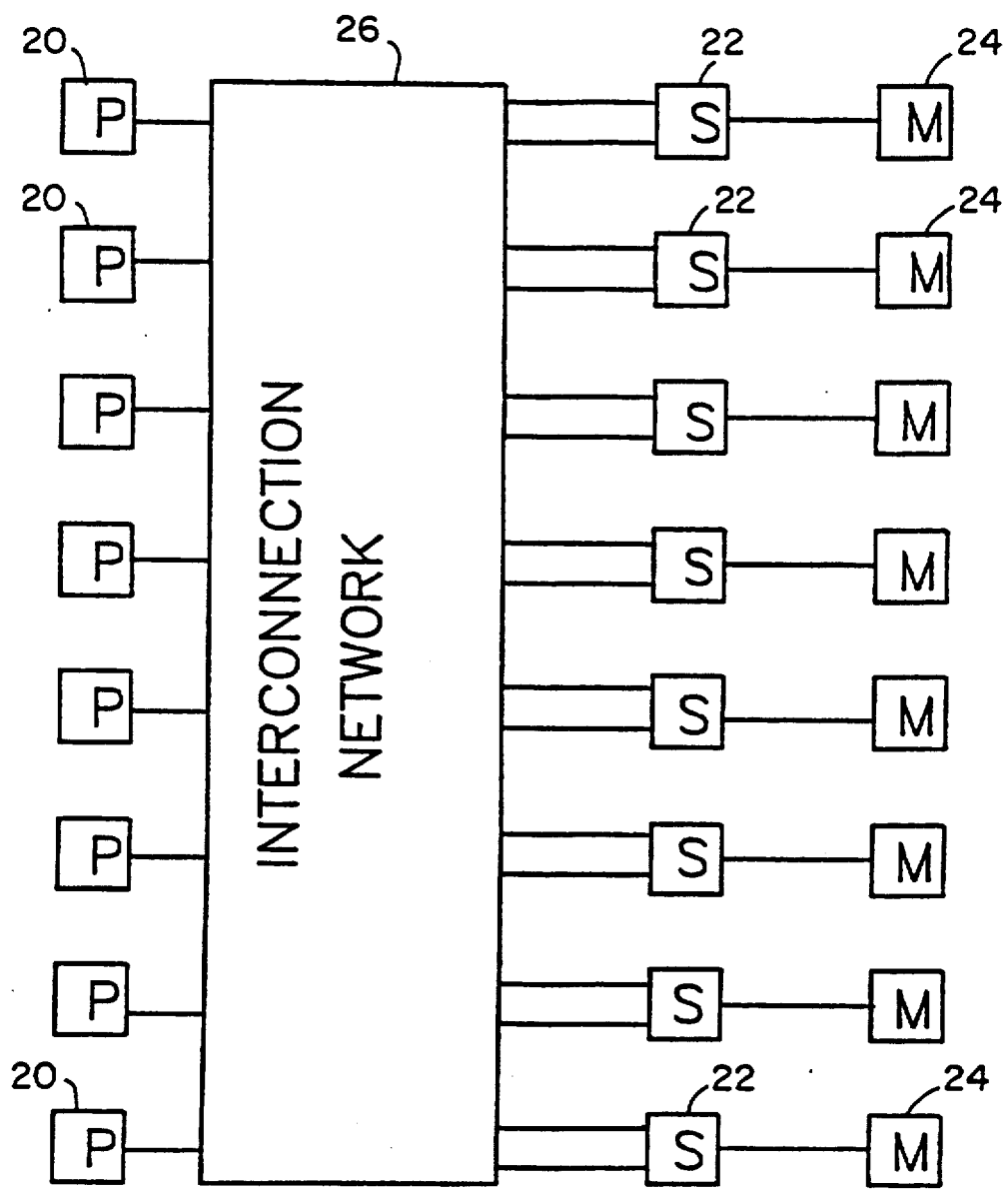
FIG. 2 is a block diagram of a synchronization network integrated with memory access.

The invention is intended to operate in a context in which processors can access separate, independent memories, in any conventional multiprocessor system. FIG. 2 shows one possible context in which one network 26 connects processors 20 to both synchronizers 22 and memories 24 In this system, a synchronizer 22 can be placed between the interconnection network 26 and memory 24 so that it can either synchronize two requests or serve as a router for individual requests passing between processors and memories.

Figure 3:
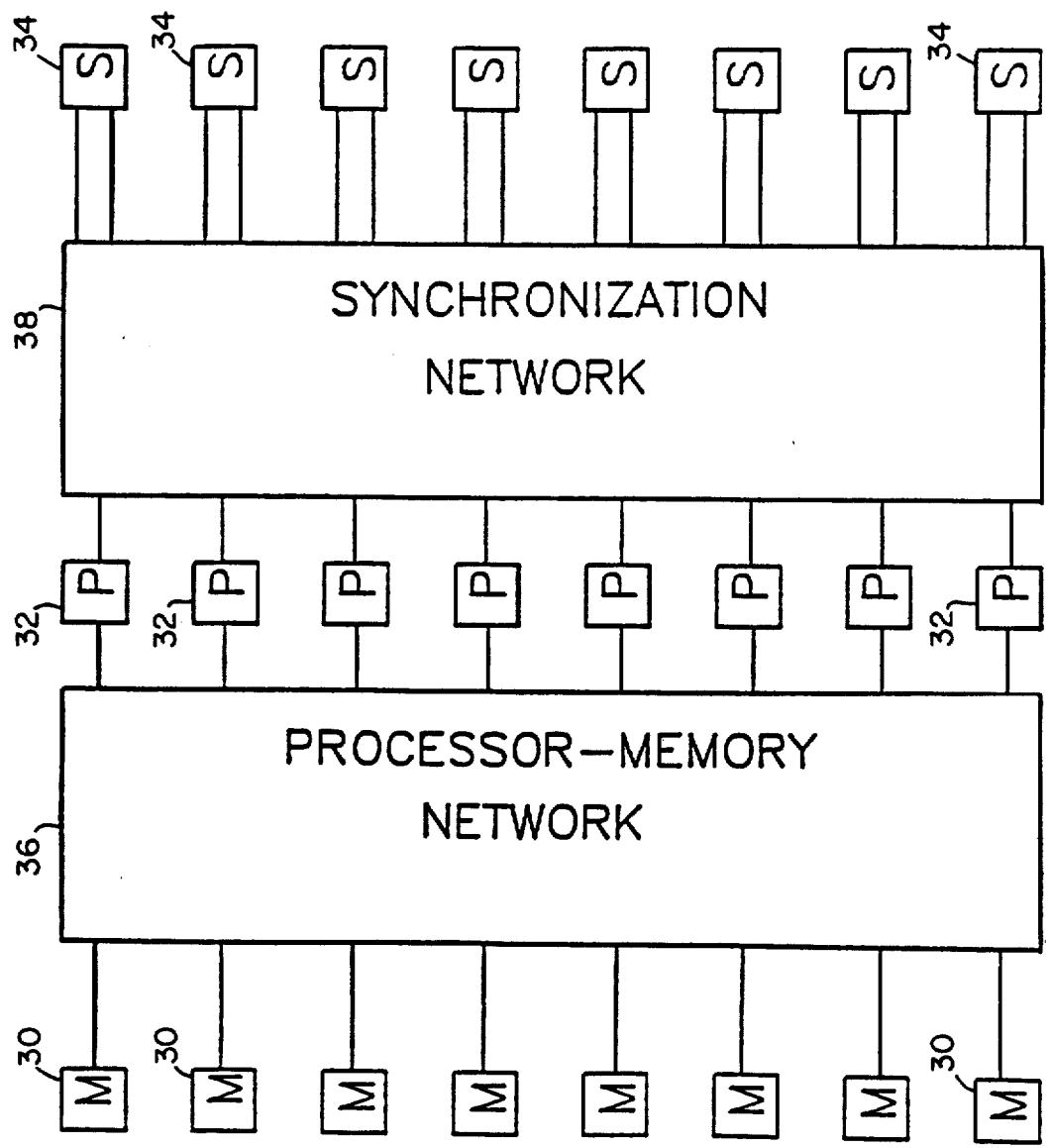
FIG. 3 is a block diagram of a separate synchronization network.

An alternative context for the invention is shown in FIG. 3. In this system processors 32 are connected to memories 30 through a network 36 dedicated to this function. Synchronizations are treated by a separate network 38 that passes synchronization requests to the synchronizer modules 34.

Thus, the invention can be used in at least two contexts:
1. the synchronizer used within an interconnection network that connects processors to memories (as shown in FIG. 2).
2. the synchronizer used as separate and distinct hardware block that is connected to processors only (FIG. 3).

The interconnection network is not specified in FIG. 2. Its exact structure is not a critical part of this invention. Later it is shown how two different interconnection networks can be adapted to the invention. The choice of network effects performance and cost, but not correctness of operation.

The parallel synchronization of the processors in FIG. 2 is accomplished by means of an instruction called "Synch", which is issued by the processors. Synch provides the detection of combinable requests and synchronization. In the event that combinable requests are detected, the combining, queueing, and arithmetic operations are performed by software. Although these operations are more time-consuming when implemented in software than when implemented in a combining switch, two factors reduce the impact of the software overhead:

1. Combining occurs with low frequency, so the additional cost per operation does not have a great impact on performance,
2. The elimination of logic in the synchronization switches results in a much faster switch, so that all operations that require the use of the synchronization interconnections are faster in this implementation than in a combining-switch implementation.

Figure 4:
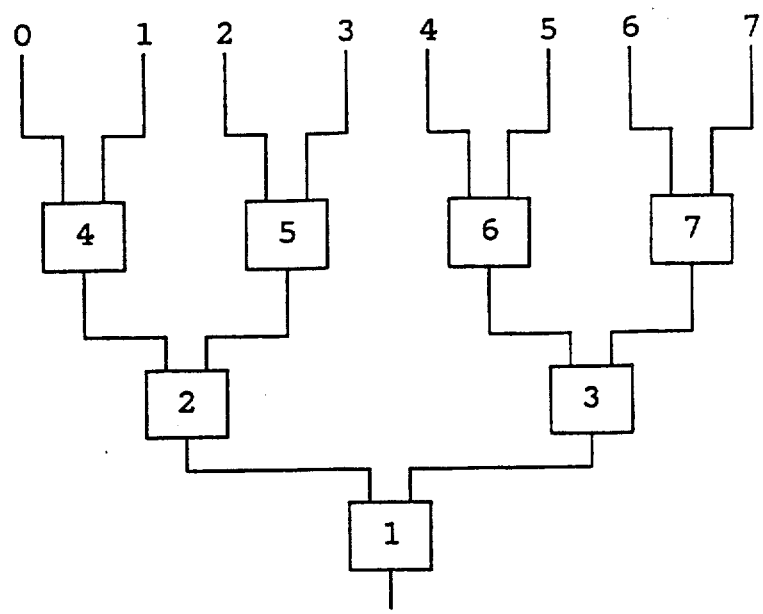
FIG. 4 is a block diagram representation of a tree used for synchronization requests.

To simulate the action of a Fetch-and-Add synchronization, each of N synchronizing processors must perform $\log_2 N$ synchronizations as depicted by the synchronization tree in FIG. 4. This tree is essentially the same as the tree of synchronizations that exists in a combining network. In the scheme required for this invention, software forces each processor to follow a path in the tree from a leaf at the top to the root at the bottom, or to terminate early if a combining operation takes place.

The tree in FIG. 4 is an abstract representation of the requests that are to be combined The software at each processor can construct and save the tree representation whenever the software must determine a sequence of requests to use, to access a shared variable. The purpose of the tree representation is to produce a sequence of combinable requests from each processor.

In FIG. 4, the requests are numbered from 0 through 7, representing the requests for 8 processors. Each node is labeled with numbers from 1 to 7. The labels are called "synch addresses", and are operands of Synch instructions to be issued by the requesters. How these labels are derived is discussed relative to FIG. 6.

A Synch instruction takes the form:
Synch(synch address, operand address);
The synch address directs the request to a particular synchronizer of the network in FIG. 2, and the operand address carries information to be exchanged in the event that a synchronization occurs. Although each synch address is associated with a specific synchronizer, each synchronizer can have many different synch addresses associated with it. Synch addresses behave like memory addresses in this regard, since each memory address is associated with a specific memory module, but a memory module may hold many different memory addresses.

Upon issuing a synch instruction by a processor 20, the synch address and synch operand are transmitted through the interconnection network 26 to the target synchronizer 22. The synchronizer 22 acts on the instruction and returns a result code and result operand. There are three possible outcomes of a Synch operation:
1. No Synch.
2. Synch Continue.
3. Synch Wait.

Figure 5:
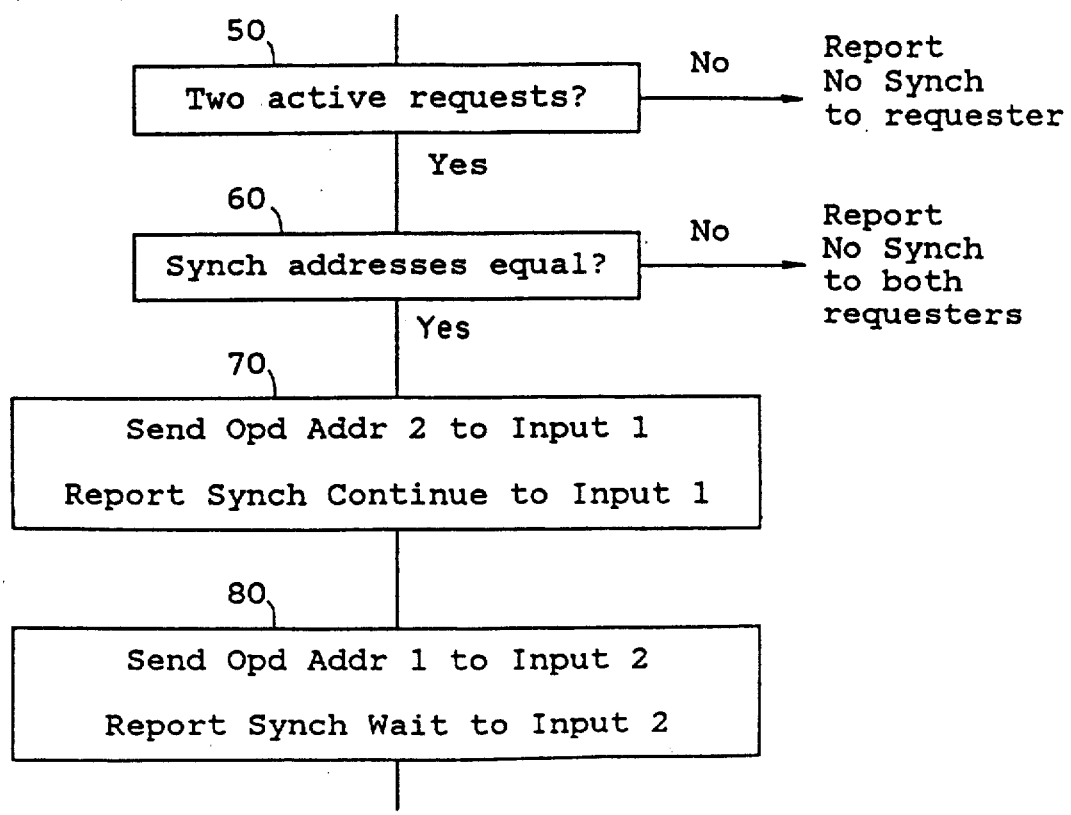
FIG. 5 is a flow chart of a synchronization request.

The action of a synchronizer in response to a pair of synchronization requests is illustrated in FIG. 5. In Logic Block 50, the synchronizer tests to see if both inputs to the synchronizer hold active requests. If either input is empty, the synchronization cycle ends by reporting No Synch to an input that has an active request, if there is such a request.

If both inputs hold active requests, at Logic Block 60 the synchronizer tests to see if the synch addresses are equal. If they are unequal, No Synch is returned to both requesters.

Logic Block 70 shows how the synchronizer responds to requests that have equal synchronization addresses. Input 1 receives a Synch Continue result, and also receives the operand address from Input 2.

In Logic Block 80, it shows that Input 2 receives a Synch Wait result, and the operand address from Input 1. For the purposes of this invention it is optional if Input 2 receives the operand address from Input 1 or not. The additional logic required to transfer the operand from Input 1 to Input 2 increases the cost of the implementation, but it is also possible to use the additional information to reduce subsequent processing costs. The invention permits either mode of operation to be used at the discretion of the implementer.

The behavior of the synchronizer implementation of FIG. 5 is such that a No Synch result is returned if a request reaches a synchronizer when the other synchronizer input is either empty or contains a noncombinable request.

When two noncombinable requests are received simultaneously at the synchronizer, each request is returned immediately in the same clock cycle with a result code No Synch. It is not necessary to defer one of the requests for a later clock cycle, as is the case for memory requests. This characteristic of dealing with a plurality of requests in one cycle distinguishes this invention from many other techniques for handling memory requests and synchronization.

If two combinable requests are received in the same clock cycle, then the synchronizer returns Synch Continue to one request, and Synch Wait to the other request. The processor that receives the Synch Continue receives sufficient information to become the agent for the processor that receives Synch Wait. For the immediate future, the continuing processor performs actions that do the work required for itself as well as for other processors for which it has become the agent. A processor that has an agent acting on its behalf is said to be a "client" of that agent. When the work is completed, the agent processor reports the results of activity to the waiting client processors so that they can continue operation as if they had performed the work individually. However, the synchronization activity reduces requests on connection networks and memory systems as it assigns agents to client processors that subsequently become idle while the agent processors act on their behalf.

When a system is lightly loaded, the probability of combining requests is very small, but the synchronization operations add a small overhead in time to overall time required to execute the operations being synchronized. When synchronization requests become frequent, the probability of combining greatly increases, and as it increases, the combining of requests tends to reduce the request load. Thus, synchronization tends to stabilize the behavior of a multiprocessor computer system by reducing peak loads of synchronization activity.

2. Software Utilization of Synchronization Capability

The objective is to issue Synch requests in a manner that balances requests across the synchronizers. The tree depicted in FIG. 4 shows one such way of balancing requests. Note that a total of N−1 distinct synch addresses are involved in synchronizing N requests These synch addresses can be created in a way that distributes the addresses to N distinct synchronizer modules. To the extent that the network in FIG. 2 can route requests to N different synchronizers without conflicts, the network will support a high synchronization rate.

If synchronizations occur frequently in a local portion of a parallel program, the synchronizations collide at a synchronization module. The effect of such a collision causes a pair of requests to be replaced by a single request. The processor that receives Synch Continue becomes the Agent processor, and combines its request with the request of the partner that receives Synch Wait. The Agent processor then continues with the composite request. In FIG. 4, the idea is that two requests combined at an upper node are carried forward as a single request to the next lower node. Combining may occur again. Eventually, a request emerges at the bottom of the tree. This composite request is then executed on a shared variable. A shared variable is a variable that is modified by more than one processor, for example, an integer to which more than one processor adds an increment. The effect of the composite request on the shared variable is then passed up the tree. Each task that received Synch Continue, passes information to its partner task that received Synch Wait, releasing the waiting task to return upward in its path, retracing the steps taken down the tree.

When combining occurs, requests to the Synch network, and eventually to a memory cell that contains shared data, are reduced, thereby reducing the bandwidth requirements on the shared data, and reducing queueing delays at the shared data that might otherwise occur.

Figure 6:
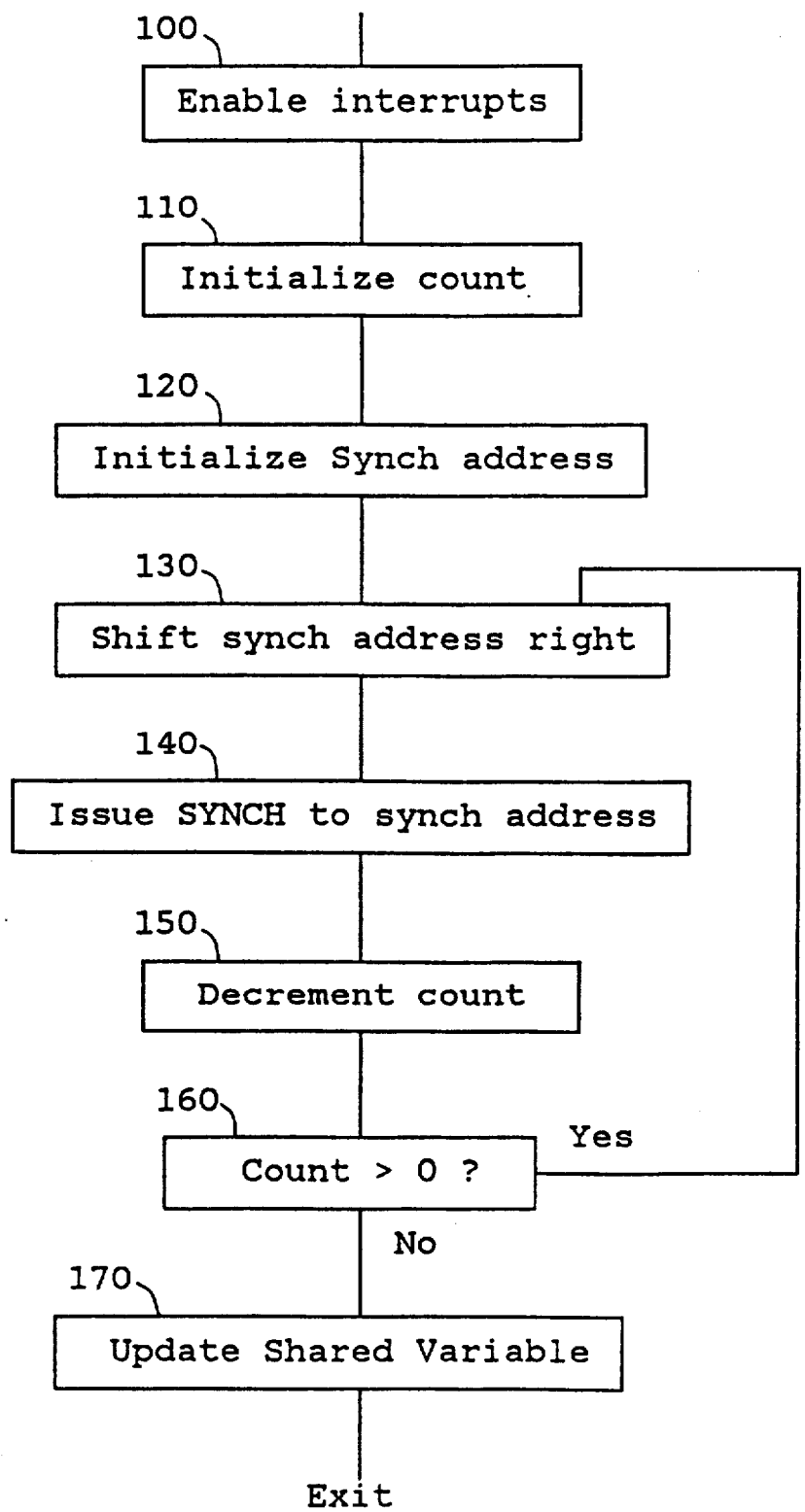
FIG. 6 is a flow chart of the synch instruction method.

The basic software loop for each processor produces $\log_2 N$ Synchs at the addresses shown in the tree in FIG. 4, starting at a leaf of the tree, and descending through the tree to its root. N is the number of processors and the maximum number of concurrent requests. For the example given in FIG. 4, N is equal to 8. Assume that Synch causes an interrupt when it returns Synch Continue or Synch Wait, and no interrupt when it returns No Synch. The algorithm in FIG. 6 is executed by Processor i to traverse a path in the tree representation of FIG. 4. The first Synch address visited by Processor i is given by $\text{trunc}[(i+N)/2]$, and subsequent addresses are obtained by successive truncated divisions by 2, which are implemented by shifting the address to the right one bit position for each successive access. The function trunc(x) produces the integer part of x. For example, $\text{trunc}(3.5) = 3.0$ and $\text{trunc}(3) = 3$.

Logic Block 100 of FIG. 6 enables the processor interrupt system so that an interrupt occurs when a Synch Wait or Synch Continue request is received Logic Block 110 initializes the count that controls the number of iterations of the main loop. Logic Block 120 computes the initial synch address for the main loop, which for Processor i is given by (i+N). The loop begins at Logic Block 130 with the shift right of the synch address to produce a new operand for the Synch instruction. The sequence of addresses produced by Logic Block 130 corresponds to the sequence of nodes on the path from a leaf node at the top of the tree in FIG. 4 to the root node at the bottom of the tree.

Logic Block 140 issues the Synch Instruction to the synchronization module. The loop count is decremented in Logic Block 150, and the loop is restarted if Logic Block 160 indicates that more nodes remain to visit. At the loop exit, the processor updates the shared variable, as indicated in Logic Block 170.

As an example of the sequence of addresses produced by the given functions, assume that are N=8 processors, and that processor 5 is executing the algorithm in FIG. 6. The synch address is initialized to 13. The first address produced is $\text{trunc}(13/2) = 6$, and the subsequent addresses are 3, and 1. These addresses are the same as the node numbers on the tree path from input 5 to the tree root in FIG. 4.

If no synchronizations occur, all blocks of FIG. 6 are executed. If a processor experiences a Synch Wait or Synch Continue, it interrupts and continues processing at blocks shown in FIGS. 7-10, as described below. If the Synch instruction is relatively fast, then the cost of execution of the loop in FIG. 6 is very low when synchronizations do not occur. Only when synchronizations occur is a time penalty incurred But such penalties are balanced by the savings in processing due to the combining of requests.

Figure 7:
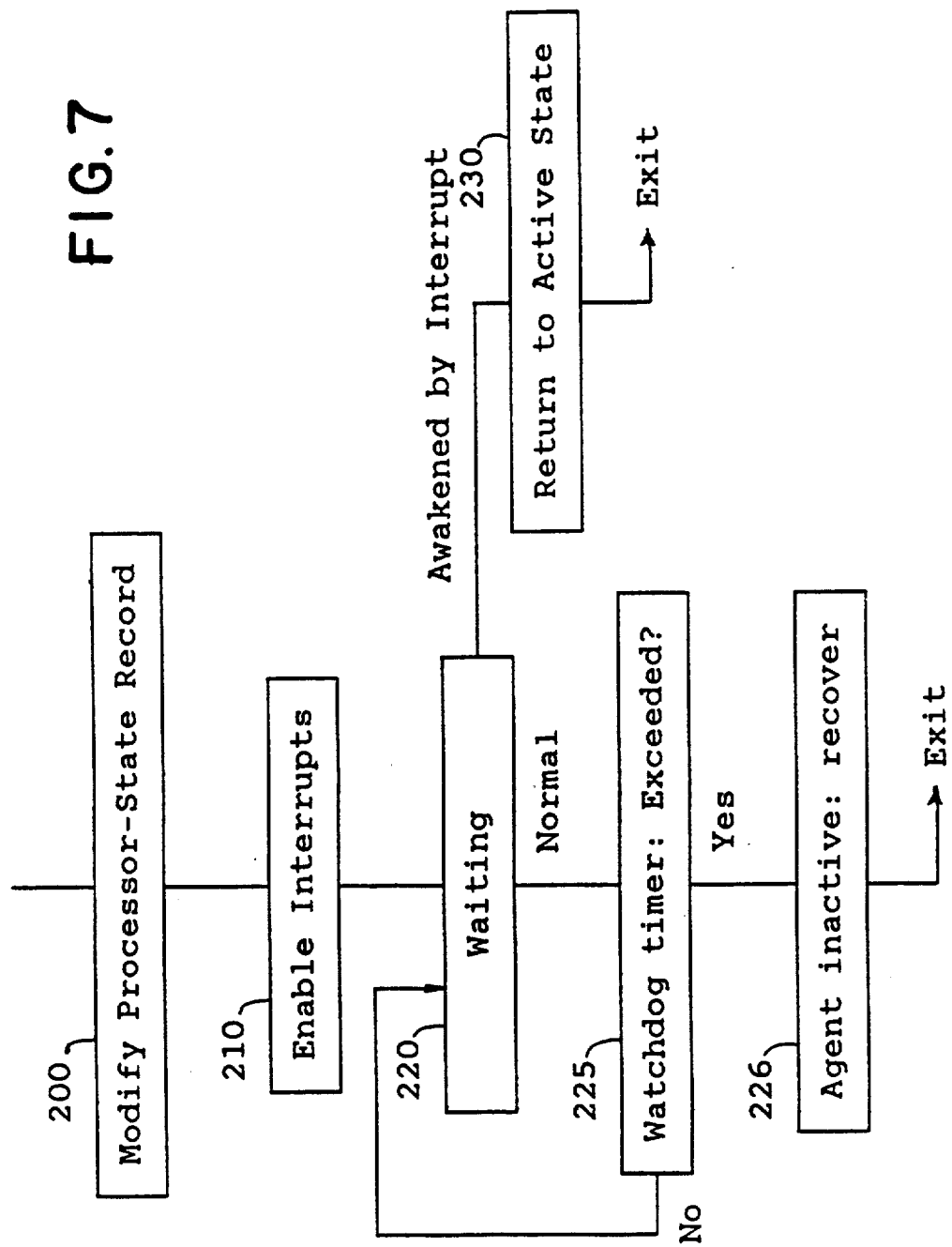
FIG. 7 is a flow chart of processor activity after receiving synch wait.

FIG. 7 shows the action that occurs when a processor receives Synch Wait. Logic Block 200 shows that the processor modifies its state record so that when processing resumes, the software does not continue the execution of FIG. 6 from the point of interruption. In Logic Block 210, the processor reenables interrupts, and then moves to a Wait state in Logic Block 220. In Logic Block 230 the processor is reawakened by an interrupt posted by its agent processor when the agent has completed the joint task. The processor then returns to the computation as if it had completed the update of the shared variables on its own, using the information returned to it by the agent processor.

Logic Block 225 is a watchdog timer that prevents a processor from waiting indefinitely. If waiting time exceeds a fixed amount of time, the watchdog timer forces an interrupt to Logic Block 226 in which recovery software attempts to deal with the problem of a nonresponding agent. If the agent's operand address is passed to the waiting processor as part of a Synch Wait action, as shown in Logic Block 80 of FIG. 5, the error processing can have available the identity of the agent as part of the recovery activity.

The activity of an agent processor is discussed here. For this example, assume that the combinable action is for a Fetch-and-Add instruction as outlined by Gottlieb et al., but any combinable instruction can be performed in a corresponding fashion.

A Fetch-and-Add specifies a target variable and an increment. The Fetch-and-Add with combining does the following:

1. If two Fetch-and-Add's are combined, then only one continues while the other waits. The one that continues uses the sum of the two increments. Eventually, the shared variable is incremented only once, receiving as an increment the sum of all increments that have been combined.

2. The Fetch-and-Add returns two different numbers to two requests that have been combined. One requester receives the value of a shared variable before the composite increment has been added, and the second requester receives that value added to the increment applied by the first requester. This is the same that would be received if the requests were not combined, with the updates being accomplished sequentially by the first requester followed by the second requester.

As an example of the use of the operation of a Fetch-and-Add instruction, consider what happens when two processors increment a shared variable by the amounts 2 and 5, respectively. The initial value of the shared variable is 6. During the execution of Fetch-and-Add assume that the first processor becomes the agent for the second processor due to a synchronization. The first processor adds the two increments to create a new increment of size 7. Assuming that no additional synchronizations occur, the first processor increments the shared variable by the amount 7, producing a final result of 13. The first processor also obtains the initial value of 6 while updating the shared variable. After updating the shared variable, the agent computes the value of the shared variable that would have been observed by its client, if the agent processor had incremented the shared variable before the client incremented it. This number is the sum of the original value (6) and the increment of the agent processor (2). Consequently, the agent processor reports the value 8=6+2 to the client processor.

Thus, the memory is updated only once for an entire collection of combined requests, the requesters obtain a set of values as if the requests were executed in some serial order, and the delay attributed to synchronization tends to grow as log N rather than as N in the worst case.

The data structure shown in FIGS. 8-10 indicates how the combining is accomplished in software. FIG. 8 shows the structure before synchronization is attempted. The Synch Operand is an increment with a Flag bit initialized to 0. (The Flag bit is used by a waiting process. When the Flag changes, the waiting processor can resume.)

There are three different kinds of events.
1. Action after Synch Continue interrupt
2. Action after Synch Wait interrupt
3. Action to release a processor in Synch Wait state.

FIG. 9 shows the situation for Synch Continue. The invention provides a means for the continuing (agent) processor to keep track of the operand address of each increment that has been combined with its request. The operand address returned by Synch Continue is the address of the current increment of the waiting process. The continuing process obtains the current increment of the waiting process by accessing the memory of the waiting process. This can occur over the same network that is used for synchronization or over a separate network whose primary function is to support data access from processor to processor.

Figure 12:
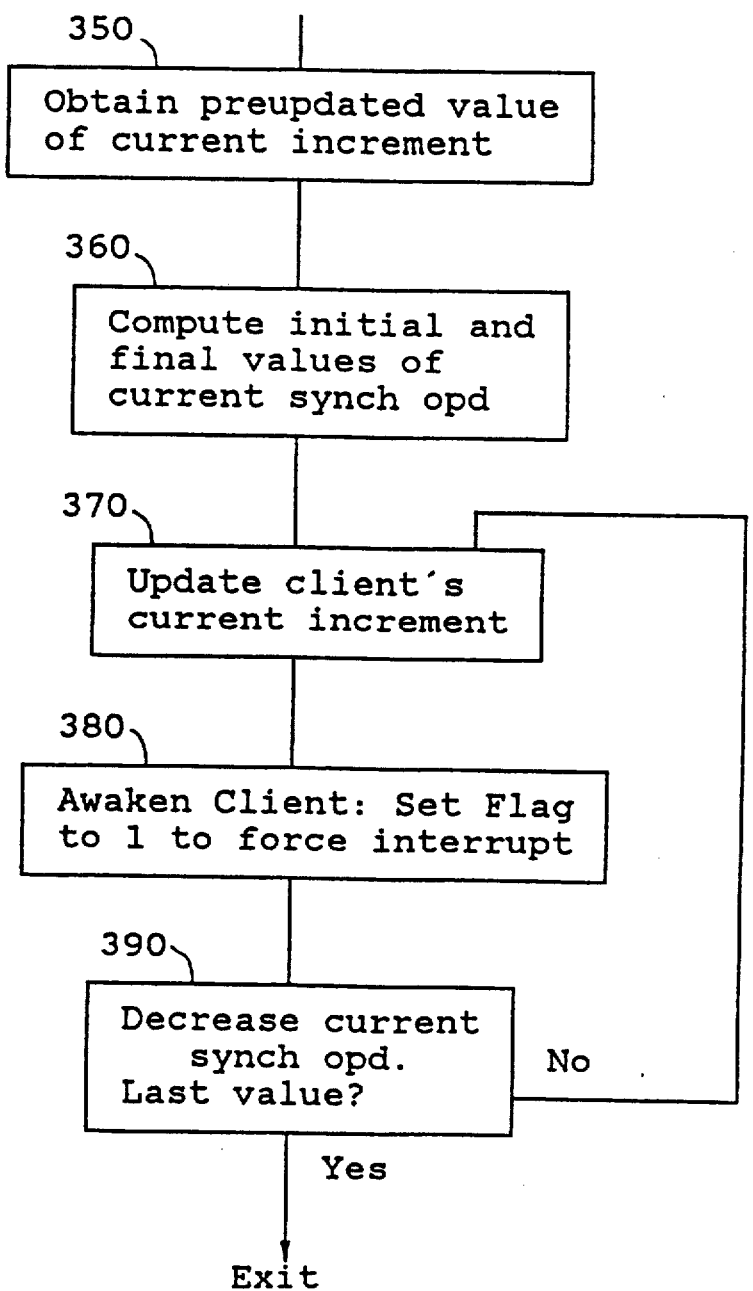
FIG. 12 is a flow chart of the "return values to a client" and "to awaken the client" functions.

FIG. 10 is to be described in relation to the discussion that follows relative to FIG. 12.

Figure 11:
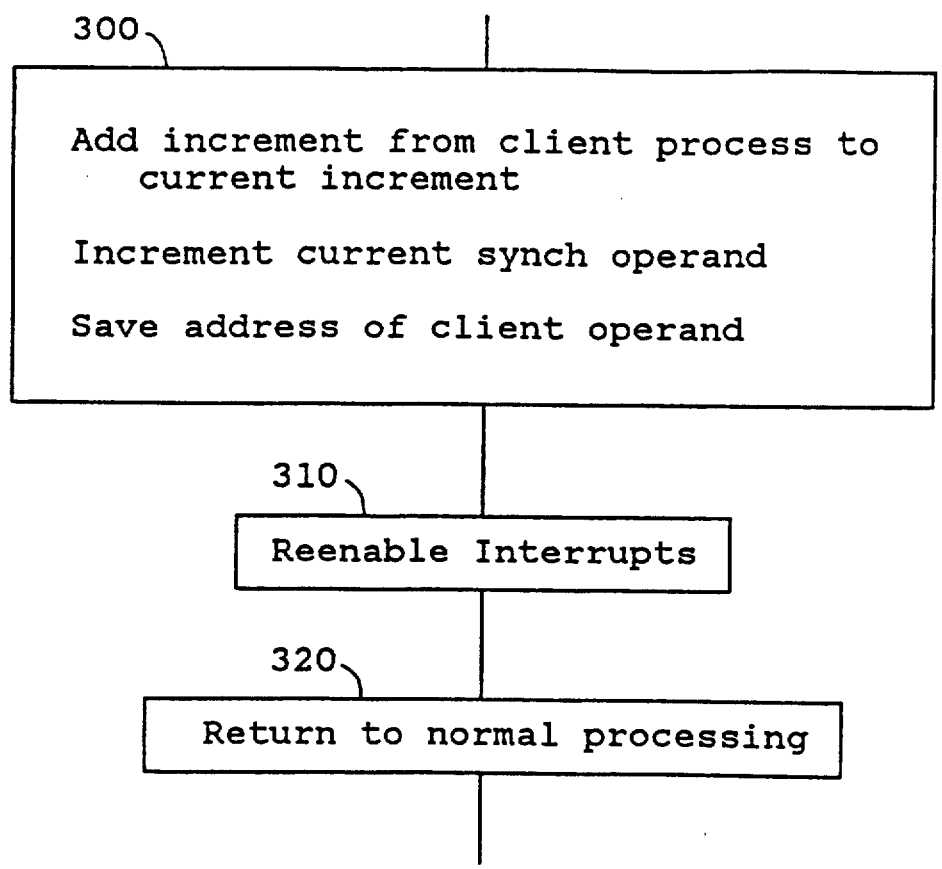
FIG. 11 is a flow chart of the action taken for the "Synch Continue" response.

The process performed by an agent when it takes a client is depicted in FIG. 11. In Logic Block 300, the agent processor adds the increment of the client process to its own increment in order to continue with the simulation of the combining action of the Fetch-and-Add. In this case, it is assumed that Synch has returned an operand address in Reg [opd address]. It is also assumed that "current synch operand" is a register pointer to an array element in memory.

Logic Block 300 is the sequence of actions
(1) Memory [current increment]:=Memory [current increment + Memory [Reg [opd address]];
(2) increment (Reg [current synch operand]);
(3) Memory [Reg current synch operand]]:=Reg [opd address];

Logic Block 310 reenables interrupts, and Logic Block 320 returns to normal processing activity, in this case in FIG. 5.

When a process succeeds in passing through the entire synch tree to the root, the process then updates a shared variable in any manner that is safe. The agent processor then returns information to waiting client processors as described in FIG. 12. During the update, the agent processor obtains the value of the shared variable before the update. This value has to be passed up the tree. To do so, in Logic Block 350 of FIG. 12, the agent process places the preupdated value in its current-increment cell so that the data structure is as shown in FIG. 10. Now the process ascends the synch tree, releasing client processes that have been waiting. To do so, it computes the initial and final loop indices of a loop in Logic Block 360, and then enters the loop. Logic Block 370 puts a new value in the current-increment cell of the next waiting process in the data structure of FIG. 10. In Logic Block 380 the agent process then sets the flag cell of the waiting process to 1, which releases the process by forcing an interrupt in the waiting client processor. Logic Block 390 decreases the current synch-operand counter and tests to determine if the loop is complete. If not, it returns to the top of the loop at Logic Block 370 to release the next client process.

The activity described by FIG. 12 is also described by the following program:

```
Memory [current increment]: = prior value of shared
   variable;
Compute initial and final values of current synch
   operand;
LOOP:
Reg [opd address]: = Memory [current synch
   operand];
Reg [temp]: = Memory [current increment];
Memory [current increment]: = Memory [Reg [opd
   address]] + Reg [temp];
Memory [Reg [opd address]]: = Reg [temp];
Set Flag (Memory [Reg [opd address]]);
decrement (current synch operand);
if current synch operand ≠ 0 then go to LOOP;
EXIT:
```

The waiting process is initiated when its flag is set to 1. At that point it changes into a process that ascends the Synch tree, and the state of its memory is as shown in FIG. 10. The value of "current increment" has been changed to the value that should be reported up the tree. This has been accomplished by the continuing process when it performs Memory [Reg [opd address]]:=Reg [temp]
where Reg [opd address] holds the address of the current increment of the waiting process and Reg [temp] holds the value to report to the waiting process.

A waiting process that is awakened by an agent process at Logic Block 230 of FIG. 7 is in a state in which it can continue at Logic Block 350 of FIG. 12. A waiting processor may have earlier become an agent for a different processor before receiving a Synch Wait response. Hence, it is awakened as if it were an agent processor, and it returns up the tree awakening waiting processors for which it is an agent by executing the block diagram of FIG. 12.

For this invention, the use of interrupts to perform the operations in the figures is optional. The interrupt code can be implemented as embedded code guarded by tests on the return code of the Synch Instruction. The actions can be initiated on return codes of Synch Continue or Synch Synch Wait.

3. Synchronization within a Crossbar

This discussion demonstrates the use of the invention within the crossbar connection structure depicted in FIG. 13. A crossbar switch brings together more than two requests, and provides a means for arbitrating the requests. Logic Box 400 in FIG. 13 is a network that connects each processor 410 to each memory 420 in a manner that each processor request passes through a single one of a plurality of switch points 430 within Logic Box 400 in passing from processor to memory. As previously discussed, it is not necessary to have memories included in the structure of FIG. 13. The structure can be dedicated to synchronization only.

To use the network in FIG. 13 for synchronization, the invention is to expand slightly the function of the crossbar so that the switch associated with a memory can be used to synchronize requests that reach the switch.

A switch in the crossbar has the general structure shown in FIG. 14. Logic Boxes 450, 451, 452 and 453 represent processors. Requests for access to the switch are issued from processors on inputs labeled 455, 456, 457 and 458, respectively. The requests are directed to an arbiter 460. The arbiter 460 returns results via outputs 470. As a result of the arbitration, one requester gains access to the switch point 480 and passes information to the switch point 480 or receives information from the switch point 480 on connections 490. The switch point is connected to one memory.

The aspects of this crossbar that constitute prior art and are not part of this invention are:

1. Two or more processors can issue requests to the arbiter in any cycle.
2. The arbiter selects a single winner from among the pending requests, and returns a Grant to the winner.
3. The winner then continues, and all other requests are held pending and repeated in the next arbitration cycle. New requests can also enter at the next arbitration cycle.
4. Arbitration can be prioritized in any way that is suitable for the computer system. It can give specific processors higher priority than others, or it can rotate priority so that on the average no processor receives a greater priority than other processors. The prioritization scheme is not important for the purposes of this invention.
5. In many networks of the type shown in FIG. 14, arbitration for Cycle i+1 is overlapped with the actual transaction for Cycle i. For example, if Processor 450 requests a particular datum, then it can send its request to the arbiter at Time 10, and if granted in that cycle can obtain the datum during Time 11. Meanwhile, if Processor 452 needs a different datum, it can request that datum during Time 11 (while Processor 450 is executing its transaction), and if Processor 452 wins that round of arbitration, it can perform its transaction during Time 12. Thus, arbitration delays need not reduce the useful bandwidth of the crossbar switch, although they do add to the access time observed by any individual process.

Figure 15A:
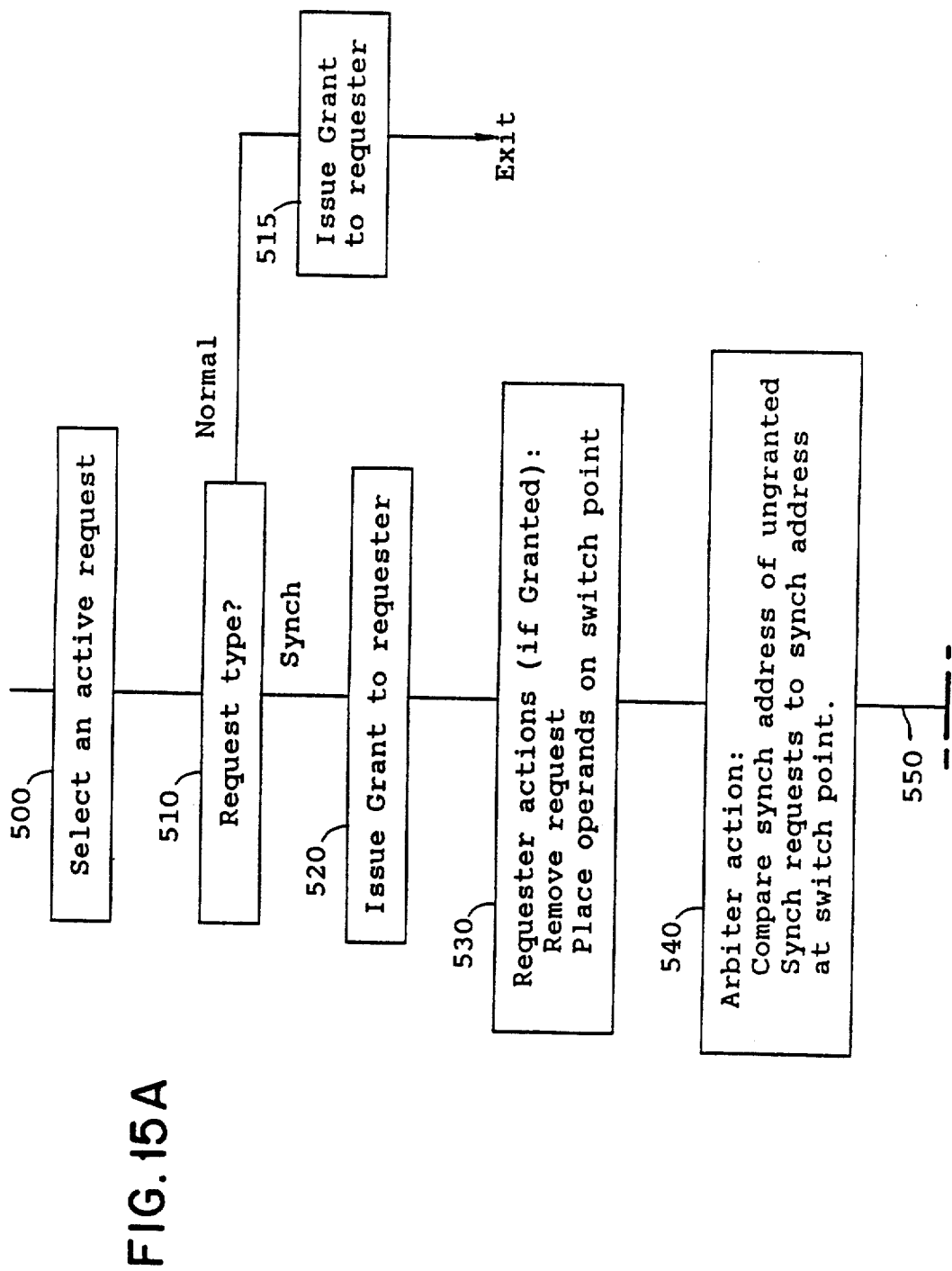
FIG. 15(a) and 15(b) are flow charts of the synchronization function at a switch point.
Figure 15B:
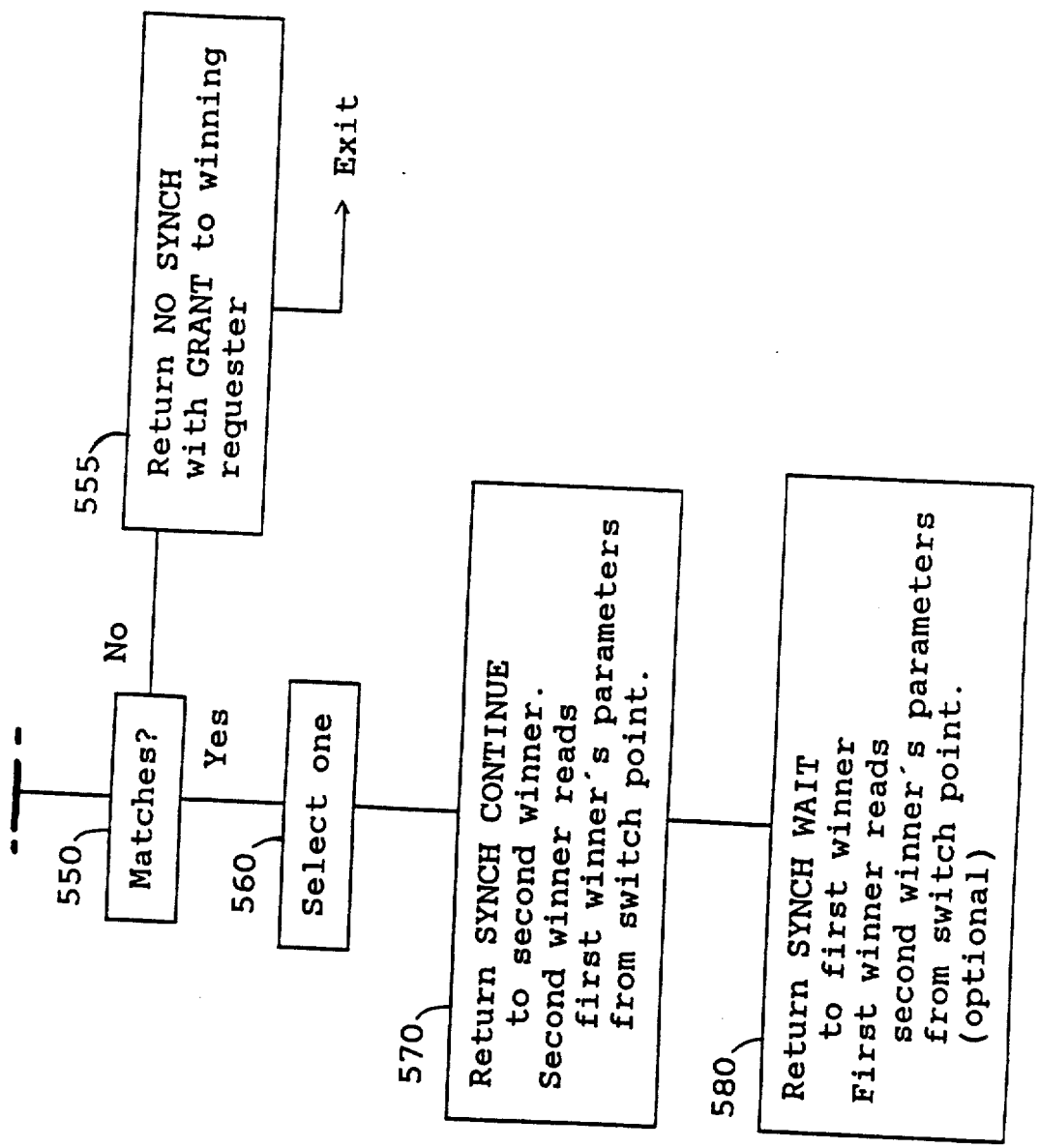

The novel aspects of this invention with respect to crossbar switches consists of the comparison mechanism shown in FIG. 15 that enables the switch to implement synchronization. The idea is that if a synchronization request is granted by the arbiter, then that request is synchronized with one other request for the same synch address if there is one pending. If a total of three or more requests are pending for the same synch address, then the switch synchronizes only two of them, and the remaining requests are held pending to be synchronized on the next cycle.

In Logic Block 500 of FIG. 15, the arbiter selects a request from among the pending requests according to any acceptable selection scheme. In Logic Block 510, the arbiter determines if the request is a normal request or a Synch operation. If the request is normal, the requester is returned a Grant in Logic Block 515 and the arbitration cycle terminates. If the request is for a Synch operation, the arbiter issues a Grant to the requester in Logic Block 520. This assures that the requester will write to the switch point if a synchronization actually occurs. In Logic Block 530 the requester removes its request from the arbiter and places its synch address and operand address at the switch point.

In Logic Block 540 the contents of the switch point is compared to the synch addresses of other pending Synch Requests. This is performed by means of one or more comparators that compare two addresses, one of which is the switch point and one of which is from an active Synch request. A means for implementing this capability is described in FIG. 16 and discussed later.

In Logic Block 550 the arbiter determines if there is any other active Synch request for the same synchronization address. If not, the synchronization cycle ends by returning No Synch to the active request that is currently connected to the switch point in Logic Block 555.

Otherwise, in Logic Block 560 the arbiter selects one request from among the plurality of active Synch requests whose address is equal to the address at the switch point. The selection is made by means of the normal logic used by the arbitrator to make selections.

In Logic Block 570 the arbiter returns Synch Continue to the currently selected requester, and the contents of the switch point are gated to the return path to the currently selected requester. In Logic Block 580, the arbiter returns Synch Wait to the requester whose address is currently at the switch point. If the operation of the switch requires a waiting processor to obtain the operands from its agent processor, the arbiter can at this point reverse the switch point connections so that the operands of the processor receiving Synch Continue are passed to the processor receiving Synch Wait.

Figure 16:
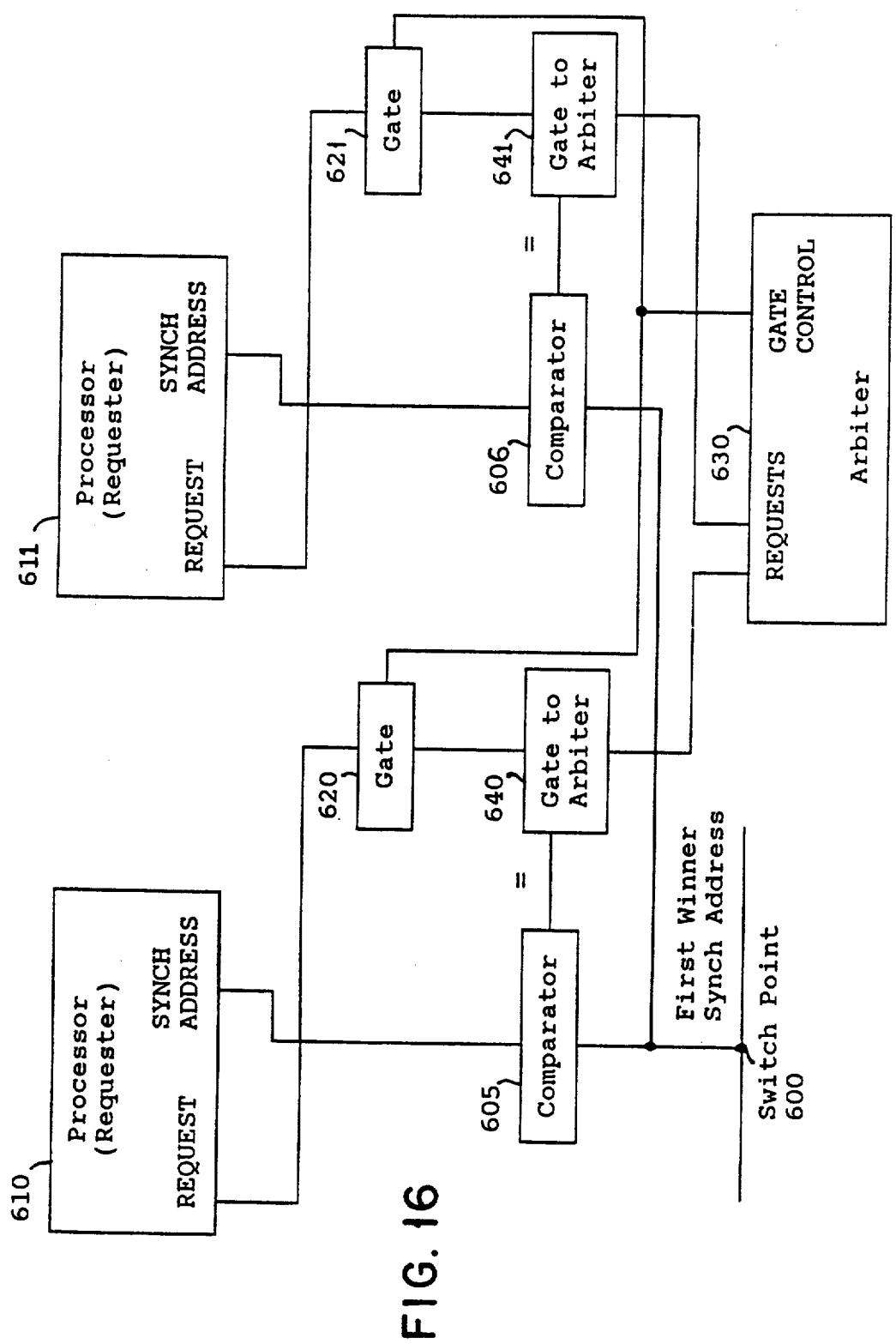
FIG. 16 is a block diagram of a switch-point arbiter that supports synchronization operations.

The mechanism for implementing Logic Block 540 of FIG. 15 is shown in FIG. 16. The switch point, Logic Block 600, is connected to a plurality of comparators 605 and 606. Each comparator receives a synch address from the switch point and from processors 610 and 611, respectively. The arbiter 630 signals that a comparison is required through its Gate Control output. This signal is routed to gates 620 and 621 associated with comparators 605 and 606, respectively, that also receives an input from processors 610 and 611, respectively. If a processor is making an active synch request and if the arbiter has activated its Gate Control output, then gates 620 and 621 produces a signal that enables the output of a comparator to reach the arbiter. The control of the output of each comparator is accomplished by gates 640 and 641, which in turn are enabled by Logic Blocks 620 and 621, respectively. The only requests that reach the arbiter as a result of this operation are active Synch requests at the same synchronization address as the synchronization address now present at the switch point. These requests are from potential agents, and the arbiter selects one requester to be the agent.

The comparators shown in FIG. 16 can be reduced in number by sharing one comparator among a plurality of requesters. If so, the switch can have as few as one comparator in total, to as many as one comparator per requester. When a plurality of requesters share one comparator, the active Synch requests among the requesters are compared to the switch point one-at-a-time, until a matching request is discovered by one of the comparators. The arbiter may select from among the first matching requests reported to it, or may defer selection until all matching requests have been identified.

The advantage of using fewer comparators is the reduction in cost of the hardware, but the decreased hardware cost is accompanied by an increase in time to completion of the arbitration.

4. Synchronization using multilevel networks

Figure 17:
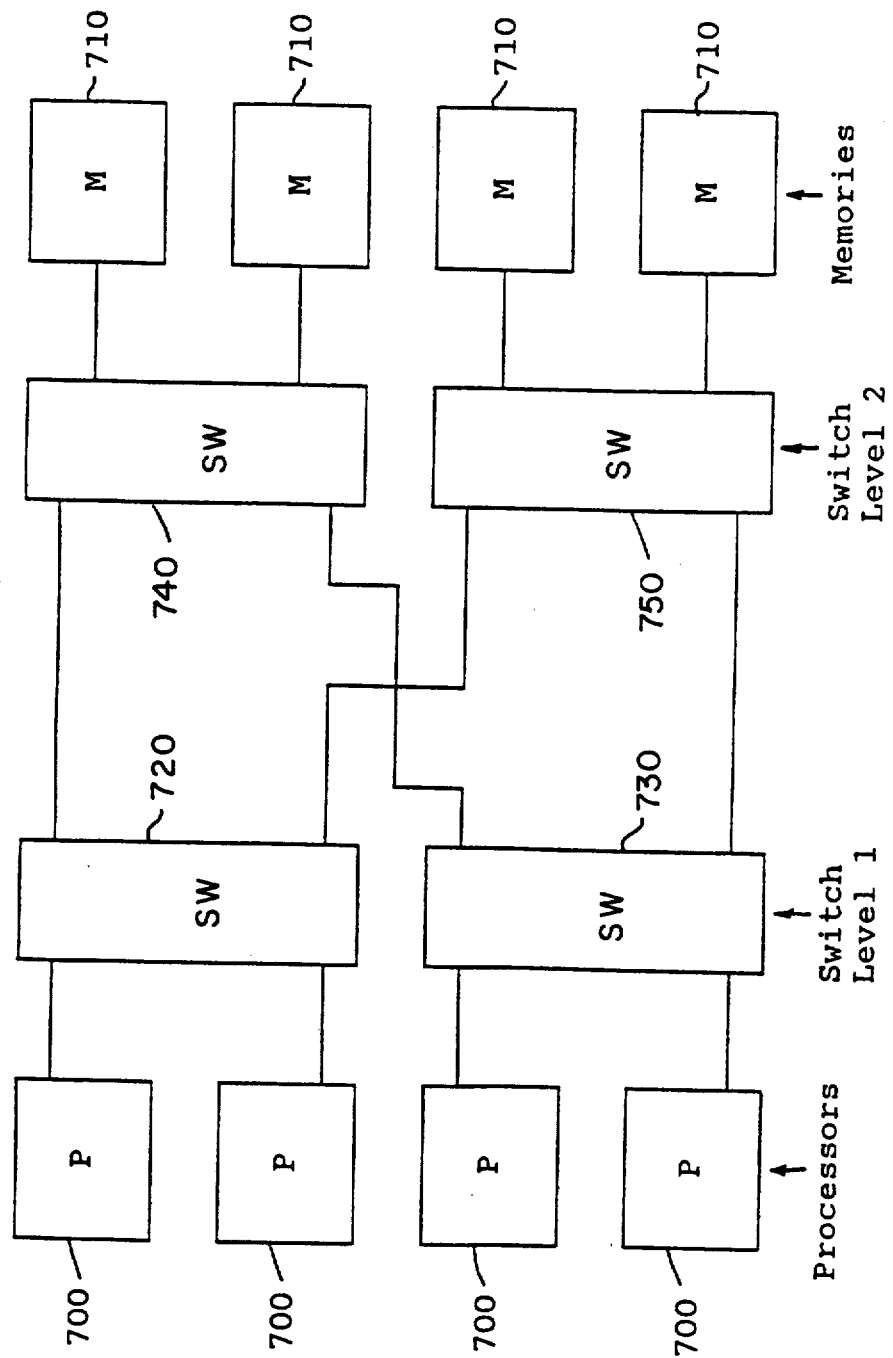
FIG. 17 is a block diagram of a multilevel switching network.

Another network in which the present invention can be embedded is a multilevel network such as the one shown in FIG. 17. Logic Blocks 700 are processor modules and Logic Blocks 710 are memory modules as in FIG. 13. The network structure in this case consists of several layers of switch cells, Logic Blocks 720, 730, 740 and 750, each of which has a small number of inputs or outputs. In the figure shown, each switch cell has two inputs and two outputs. In general, multilevel networks can have more than two inputs and outputs, but no cell has as many inputs and outputs as there are processors and memories in the computer system.

For this invention a multilevel switching network is any interconnection network that routes requests through a plurality of levels from the N processors to the inputs of a memory module. The use of the invention in this network embeds the synchronization function in the last level of switches. Each switch at this level collects requests from a plurality of switches in the level before, and selects a request to forward to one or more memory modules.

Each switch in the multilevel network is functionally equivalent to a crossbar network. The number of inputs and outputs of an individual switch is a small number that is limited by the technology available for switch construction. The network structure shown in FIG. 17 is required when the number of processors and memories that have to be interconnected exceed the number that can be connected by a single crossbar switch.

To use the invention in a multilevel switching network, replace the last level of switches with switches that support the Synch operation. Since each switch is essentially a crossbar, to embed the invention in the network, simply replace each crossbar switch in the last level by a crossbar switch that supports synchronization as described in FIG. 14.

With the indicated substitution made, the network in FIG. 17 has the capability of synchronizing requests as well as connecting processors to memories. A Synch instruction traverses the network until it reaches the last stage of switches. At the last stage, it reaches an arbiter, and awaits a response from the arbiter. Eventually it receives a No Synch, Synch Wait, or Synch Continue result and returns through the network to the processor at which the request originated.

The network need not be used to connect processors to memories. The memories can be omitted, and the network can be dedicated to synchronization.

Another optional aspect of the design is that the switch modules in the network other than those in the last level can also be synchronizer modules. That is, any such switch can be a crossbar switch with the synchronization function instead of being just an ordinary crossbar switch. Only the switches in the last level are required to be synchronizing crossbar switches.

If synchronization is embedded in a crossbar switch at a level other than the last level, such a switch should pass unsynchronized Synch requests toward memory (the switch output), instead of returning them immediately toward the processors (switch input). Synchronized requests should be combined and returned toward the processors.

Figure 18:
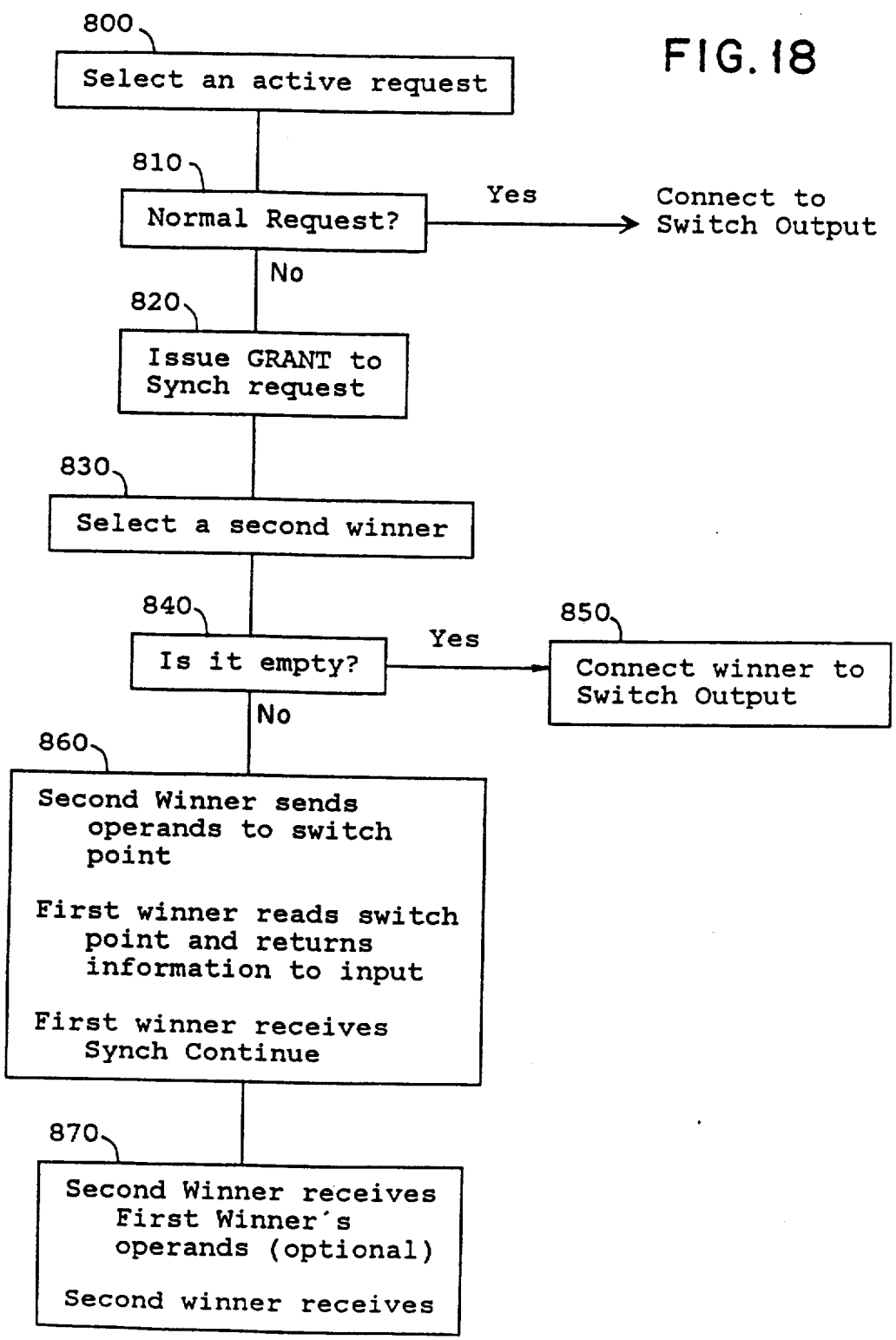
FIG. 18 is a flow chart of the function of a switch module in a multilevel network at a level that is not the last level.

This modification of synchronization operation is depicted in FIG. 18. At Logic Block 800, the switch selects a request from among the pending requests according to any acceptable selection scheme. Normal requests are identified at Logic Block 810, and passed to the switch output. Logic Block 820 selects a Synch request, and issues a Grant to the request. In Logic Block 830, the winning requestor is a potential agent and places its synch address and operand address at the switch point. In Logic Block 840, the arbiter selects a second winning request to be the client from among the Synch requests that exclude the present winner. A second winner must be a Synch request at the same synch address as that of the winner. If there is no second winner, in Logic Block 850 the present winning request is sent to the switch output. If there is a second winner, in Logic Block 860 the second winner transmits its operands to the switch point, and they are read by the first winner, and reported in the reverse direction (in the direction of the module inputs). The First Winner receives a Synch Continue result.

In Logic Block 870, optionally, the first winner's operands are written to the switch point, and reported back to the second winner. The result code for the second winner is Synch Wait.

The advantage of using synchronization within switches that appear earlier in the network is that messages can be combined earlier. This tends to increase the number of successful combine operations, and to decrease the traffic in the later regions of the network.

INDUSTRIAL APPLICABILITY

It is an object of the invention to provide an improved technique of synchronizing parallel processes.

It is another object of the invention to provide combining operations for synchronization in a multiprocessor, with a reduction in hardware.

It is yet another object of the invention to provide an improved technique of synchronizing parallel processors, wherein the synchronizer performs an equality check instead of a more complex magnitude comparison.

It is still another object of the invention to provide a synchronizing technique, wherein a two-input synchronizer can accept a new request from each input on each cycle continuously, without refusing any request and forcing requests to be repeated.

It is a further object of the invention to provide a synchronizing technique utilizing crossbar switches having comparators at switch points, including an additional mode of operation that enables a crossbar switch to support combining operations.

It is yet a further object of the invention to provide a synchronizing technique utilizing multilevel switches having comparators at switch points, including an additional mode of operation that enables each internal switch to support combining operations.

It is still a further object of the invention to provide synchronization logic within a multilevel switch that allows synchronized requests to return directly from the level at which synchronization occurred without traversing all levels in both directions.

It is yet still a further object of the invention to provide synchronization logic in a multilevel switch, wherein different switches within the multilevel switching network need not all have the same synchronization capability.

It is yet still another object of the invention to provide a parallel synchronization technique utilizing a combining network in which two processes synchronize by having one process suspend operation while the second process becomes agent for the first process while continuing to operate on its own behalf.

It is yet another further object of the invention to provide an improved synchronization technique wherein the state storage is placed in the processor instead of the synchronizer.

It is yet still another further object of the invention to provide an improved synchronization technique where sequential logic is not required for purposes of synchronization, and storage is not required within the switching network for operands of synch instructions.

I claim:

1. A computing system comprising:
    a plurality of data processors, each of which includes means for issuing a synch instruction for purposes of synchronizing certain ones of said processors that are issuing a same synch instruction for indicating that a common variable is to be processed;
    a plurality of synchronizers, each of which has two inputs for receiving first and second synch instructions, respectively, from a first processor and from a second processor, respectively, of said plurality of data processors, each of said synchronizers including means for comparing the synch instructions received at the two inputs to determine equality of same, each of said synchronizers further including means, responsive to said comparing means determining that the first and the second synch instructions are equal, for signalling said first processor to continue processing said common variable for itself and for said second processor, and further including means, responsive to said comparing means determining that the first and the second synch instructions are equal, for signalling said second processor to suspend processing said common variable; and
    means for said first processor to inform said second processor of the results of the processing of said common variable for said second processor.

2. In a data processing system, the combination comprising:
    n, where n is an integer, data processors, each of which includes means for issuing a synch instruction for synchronizing certain ones of said n data processors that are issuing the same synch instruction, said synch instruction including a synch address indicative of the destination of said synch instruction, and an operand address indicative of the address of a common variable;
    n synchronizers, each of which has two inputs identified by first and second synch addresses, respectively, for receiving said synch instruction from a first processor and from a second processor, respectively, of said n data processors, each of said n synchronizers including means for comparing the respective operand address of the synch instructions received at the two inputs to determine if the operand addresses are identical, each of said n synchronizers further including means, responsive to said comparing means determining that the operand addresses are identical, for synchronizing said first and second processors, said synchronizing means comprising means for providing a first signal to instruct said first processor to continue processing operations relative to said common variable and to act as agent for said second processor in processing operations relative to said common variable, and means for providing a second signal to instruct said second processor to suspend processing operations relative to said common variable;
    means for said first processor to inform said second processor of the result of the processing of said common variable for said second processor, and
    an interconnection network which provides a plurality of data communication paths between said n data processors and said n synchronizers for selectively communicating said synch instructions from said n data processors to said n synchronizers, and for selectively communicating said first and second signals from said synchronizer to said first and second processors, respectively.

3. In a data processing system, the combination comprising:
    n, where n is an integer, data processors, each of which includes means for issuing a synch instruction for synchronizing certain ones of said n data processors that are issuing the same synch instruction, said synch instruction including a synch address indicative of the destination of said synch instruction, and an operand address indicative of the address of a common variable;
    synchronizing means for receiving said synch instruction from each said n data processors, said synchronizing means including means for comparing the respective operand address of the synch instructions from each of said n data processors to determine if the operand addresses are identical, said synchronizing means including means, responsive to said comparing means determining that at least two of the operand addresses are identical, for synchronizing the ones of said n data processors that have identical synch addresses, including means for providing a first signal to instruct a first one of the synchronized processors that have identical synch addresses to continue processing operations relative to said common variable for itself and to act as agent for the other ones of the synchronized processors that have identical synch addresses in processing operations relative to said common variable, and including means for providing a second signal to instruct the other ones of the synchronized processors that have identical synch addresses to suspend processing operations relative to said common variable;
    means for said first one of the synchronized processors to individually inform each of the other ones of the synchronized processors of the results of processing said common variable for it; and
    an interconnection network which provides a plurality of data communication paths between said n data processors and said synchronizing means for selectively communicating said synch instructions from said n data processors to said synchronizing means, and for selectively communicating said first and second signals from said synchronizing means to said first one of the synchronized processors and the other ones of said synchronized processors, respectively.

4. A computing system comprising:

a plurality of data processors, each of which includes means for issuing a synch instruction for purposes of synchronizing certain ones of said processors that are issuing the same synch instruction for processing a common variable;

a crossbar switch having a plurality of switch points, with each such switch point including means for storing a synch instruction from a first processor of said plurality of data processors;

a plurality of arbiters, with one such arbiter at each switch point of said crossbar switch for arbitrating between the synch instruction from said first processor stored at the switch point and synch instructions from at least second and third processors of said plurality of data processors;

means for comparing the synch instruction of said first processor stored at said switch point with the synch instructions of said second and third processors, under the control of said arbiter, including means for providing a first arbitration request to said arbiter if the synch instructions from the first and second processors are the same, and for providing a second arbitration request to said arbiter if the synch instructions from said first processor and said third processor are the same, with said arbiter including means for assigning one of said first, second and third processors as the agent for one of the other two processors for processing said common variable for itself and for said one of the other two processors, including means for signalling said one of the other two processors to suspend processing said common variable; and means for the assigned one of said first, second and third processors to inform said one of the other two processors of the result of processing said common variable for said one of the other two processors.

5. A computing system comprising:

a plurality of processors each of which issues requests including synch instructions for synchronizing certain ones of the processors that are issuing the same synch instruction for processing a common variable;

at least one crossbar switch having a plurality of switch points, with each such switch point including means for storing a synch instruction from a processor;

a plurality of arbiters, with one such arbiter being associated with each switch point for arbitrating between synch instructions from selected ones of said plurality of processors;

means for a given arbiter selecting a request from a first processor and determining if the request is a synch instruction;

means for storing the synch instruction from said first processor at the switch point associated with said given arbiter;

means for comparing the synch instruction of a second processor with the synch instruction of said first processor stored at the switch point associated with said given arbiter, and if the synch instructions are identical including means for signalling said given arbiter that the comparison is identical;

means for instructing the first processor to act as agent for the second processor in processing the common variable identified in the synch instruction;

means for instructing the second processor to suspend processing said common variable and become a client of said first processor during the time said first processor is acting as its agent; and means for said first processor to inform said second processor of the results of the processing of said common variable for said second processor.

6. The combination claimed in claim 5, wherein said at least one crossbar switch comprises a multilevel switch comprised of n, where n is an integer, levels of crossbar switches.

7. The combination claimed in claim 6, wherein said plurality of arbiters are situated at the nth level of said multilevel switch.

8. The combination claimed in claim 6, wherein said plurality of arbiters are situated at a level other than the nth level of said multilevel switch.

9. A computing system comprising:

a plurality of processors each of which issue a synch request and a synch instruction for synchronizing certain ones off the processors that are issuing the same synch instruction for processing a common variable;

at least one crossbar switch having a plurality of switch points, with each such switch point including means for storing a synch instruction from a processor;

a plurality of arbiters, with one such arbiter being associated with each switch point for arbitrating between synch requests from at least two of said plurality of processors;

means for storing the synch instruction from a first processor at the switch point associated with a given arbiter;

a comparator for comparing the synch instruction from said first processor stored at the switch point associated with said given arbiter, with the synch instruction issued from a second processor, and providing an identity signal if the respective synch instructions are the same;

means responsive to the identity signal from said comparator and a synch request from said second processor to provide an arbitration request signal to said arbiter;

means included in said given arbiter and responsive to said arbitration request signal for designating one of said first and second processors as an agent and the other of said first and second processors as a client, with the agent processor processing the common variable identified in the synch instruction for itself and the client, with the client suspending processing said common variable; and means for said agent processor to inform the client processor of the result of processing said common variable for said agent processor.

10. The combination claimed in claim 9, wherein said at least one crossbar switch comprises a multilevel switch comprised of n, where n is an integer, levels of crossbar switches.

11. The combination claimed in claim 10, wherein said plurality of arbiters are situated at the nth level of said multilevel switch.

12. The combination claimed in claim 10, wherein said plurality of arbiters are situation at a level other than the nth level of said multilevel switch.

13. A method of synchronizing processes in a computing system, said method comprising the steps of:

issuing a synch instruction by each of a plurality of processors for purposes of synchronizing processors that issue a same synch instruction for indicating that a common variable is to be processed;

receiving said synch instructions by a plurality of synchronizers, each synchronizer having two inputs for receiving first and second synch instructions, respectively, from a first processor and from a second processor, respectively, of said plurality of processors;

comparing the synch instructions received at the two inputs to determine if they are the same, and if determined to be the same further executing the steps of:

signalling said first processor to continue processing said common variable, and to act as agent for said second processor in processing said common variable;

signalling said second processor to suspend processing said common variable during the time said first processor acts as its agent; and informing said second processor by said first processor of the result of the processing of said common variable for said second processor.

14. A method of synchronizing processors in a data processing system, said method comprising the steps of:

issuing synch instructions, including a synch address indicative of the destination of said synch instruction, and an operand address indication of the address of a common variable, by each of n, where n is an integer, data processors for synchronizing processors that have the same operand address;

receiving said synch instructions with a synchronizer;

comparing the respective operand addresses of the received synch instructions with said synchronizer to determine if the operand addresses are identical, and if at least two of the operand addresses are determined to be identical;

synchronizing the ones of said n data processors that have identical operand addresses in their respective synch instructions;

providing a first signal to instruct a first one of the synchronized data processors to continue processing operations relative to said common variable and to act as agent for the other ones of the synchronized data processors in processing operations relative to said common variable;

providing a second signal to instruct the other ones of the synchronized data processors to suspend processing operations relative to said common variable as long as said first one of the synchronized data processors is acting as agent; and informing said other ones of the synchronized data processors by said first one of the synchronized data processors of the result of the processing of the common variable for said other ones of the synchronized data processors.

15. A method of synchronizing processors in a computing system which includes a plurality of processors each of which issues requests including synch instructions for synchronizing certain ones of the processors for processing a common variable; at least one crossbar switch having a plurality of switch points, with each such switch point being capable of storing a synch instruction from a processor, and a plurality of arbiters, with one such arbiter being associated with each switch point for arbitrating between synch instructions, said method comprising the steps of:

selecting an active request from a first processor by a first arbiter and determining if it is a synch instruction, and if so;

storing the synch instruction from said first processor at the switch point associated with said first arbiter;

comparing the synch instruction of a second processor with the synch instruction stored at the switch point associated with said first arbiter, and if the same;

instructing the first processor to act as agent for the second processor in processing the common variable identified in the synch instruction;

instructing the second processor to suspend processing said common variable as long as said first processor is acting as its agent; and informing said second processor by said first processor of the result of processing said common variable for said second processor.

16. A method of synchronizing processors in a computing system which includes a plurality of processors each of which issues a synch request and a synch instruction for synchronizing certain ones of the processors for processing a common variable; at least one crossbar switch in a multilevel switch having a plurality of switch points, with each such switch point being capable of storing a sync instruction from a processor; and a plurality of arbiters, with one such arbiter being associated with each switch point for arbitrating between synch instructions, said method comprising the steps of:

selecting an active request from a first processor by a first arbiter and determining if it is a synch instruction, and if so;

storing the synch instruction from said first processor at the switch point associated with said first arbiter;

comparing the synch instruction of a second processor with the synch instruction stored at the switch point associated with said first arbiter, and if the same;

responding to a synch request by said second processor by said first arbiter to designate one of said first and second processors as an agent and the other as a client, with the agent processor processing the common variable identified in the synch instruction for itself and the client;

instructing said client processor to suspend processing said common variable; and informing said client processor by said agent processor of the result of processing said common variable for said agent processor.

* * * * *